United States Patent [19]

Yamada

[11] 4,051,485

[45] Sept. 27, 1977

[54] PRINTING APPARATUS

[75] Inventor: Kozo Yamada, Hachioji, Japan

[73] Assignee: Oki Electric Industry Company, Ltd., Tokyo, Japan

[21] Appl. No.: 714,130

[22] Filed: Aug. 13, 1976

Related U.S. Application Data

[60] Continuation of Ser. No. 545,740, Jan. 30, 1975, abandoned, which is a division of Ser. No. 409,289, Oct. 24, 1973, Pat. No. 3,972,052.

[30] Foreign Application Priority Data

Oct. 24, 1972 Japan ............................... 47-105834

[51] Int. Cl.² ............................................. G01D 15/18
[52] U.S. Cl. ........................................ 346/75; 178/30; 197/1 R
[58] Field of Search ................. 197/1 R; 101/93.04; 346/1, 75, 140 R; 178/30

[56] References Cited

U.S. PATENT DOCUMENTS

| 3,136,594 | 6/1964 | Ascoli | 346/1 |
| 3,484,794 | 12/1969 | Winston | 346/75 |
| 3,500,436 | 3/1970 | Nordin | 346/75 |
| 3,596,276 | 7/1971 | Lovelady et al. | 346/75 X |
| 3,688,034 | 8/1972 | Kashio | 178/30 |
| 3,739,395 | 6/1973 | King | 346/75 |
| 3,769,632 | 10/1973 | Julisburger et al. | 346/75 |
| 3,834,505 | 9/1974 | Fowler et al. | 197/1 R |

Primary Examiner—Edward M. Coven
Attorney, Agent, or Firm—Peter L. Berger

[57] ABSTRACT

An ink-jet printer which blows ink drops to the surface of the printing paper so that the contours formed by the ink drop dots are letters, numerical figures and signs. The printer includes pairs of deflection plates with the amount and timing of the deflection being controlled by synchronized digitally controlled voltages.

7 Claims, 16 Drawing Figures

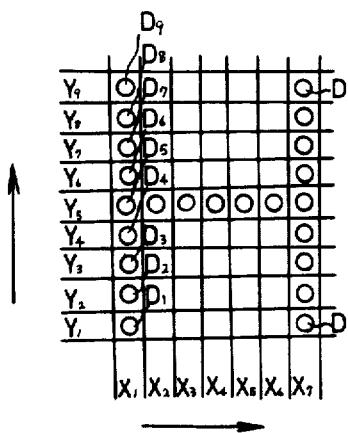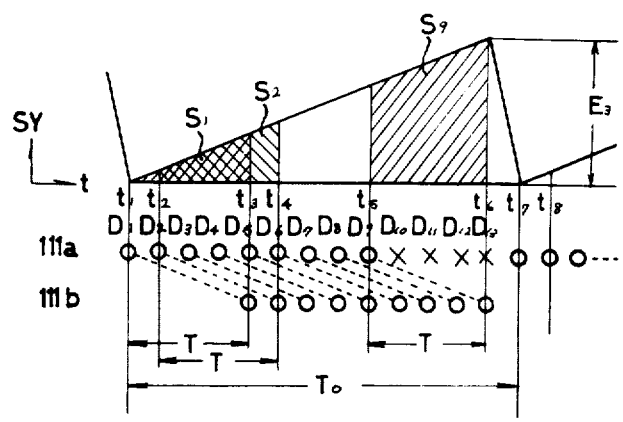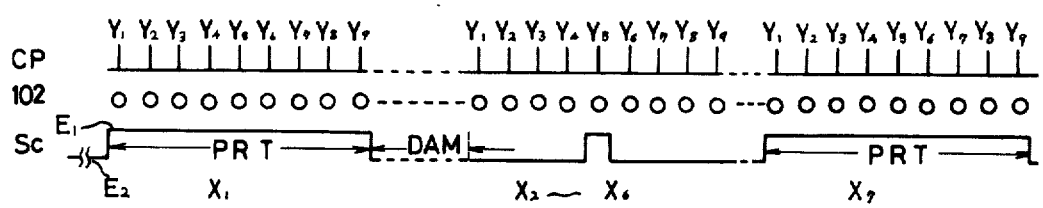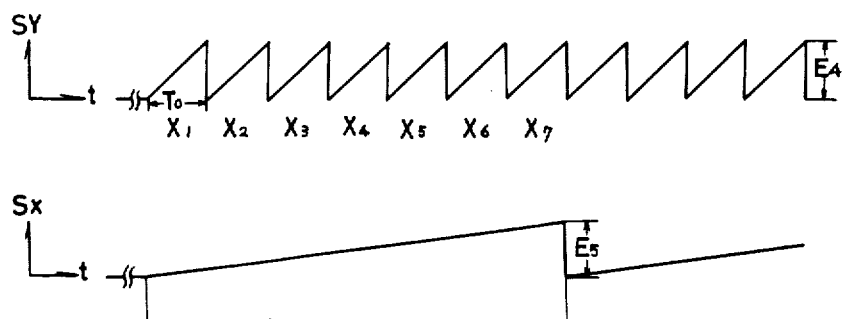

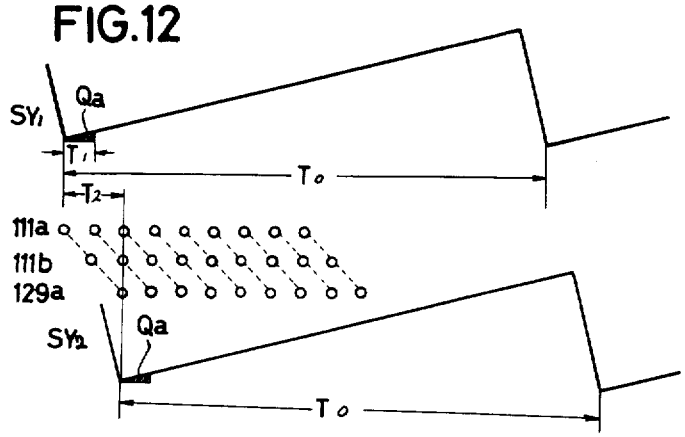
FIG.12
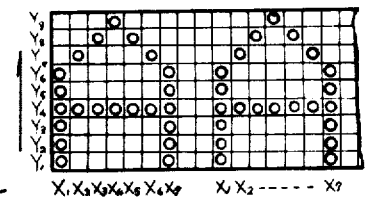
FIG.14
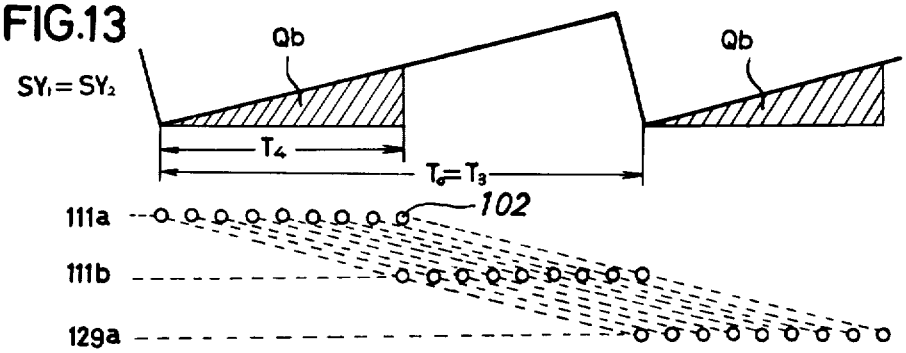
FIG.13
FIG.15
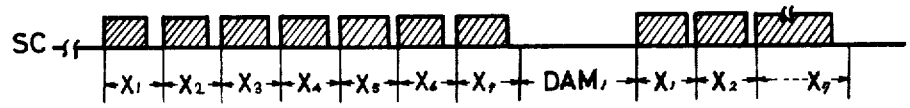
FIG.16
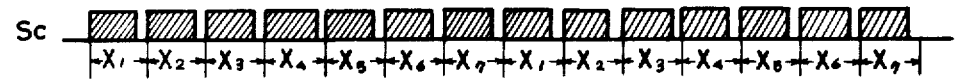

PRINTING APPARATUS

This application is a continuation of application Ser. No. 545,740, filed Jan. 30, 1975, now abandoned, which was a division of application Ser. No. 409,289, filed Oct. 24, 1973, now U.S. Pat. No. 3,972,052.

BACKGROUND OF THE INVENTION

A typical printer of this kind which has been known may consist of feeding ink to a nozzle, applying a very small pressure so that the ink may assume a semicircular form at the tip of the nozzle, establishing an electric field between an acceleration electrode positioned several millimeters in front of the nozzle and the nozzle in order to draw the ink in droplet form, applying an intense electric field between the nozzle and the platen to run the ink drops toward the surface of the printing paper, electrostatically deflecting the ink drops in both the main and sub directions like a cathode ray tube display thereby controlling the position on the printing paper surface to which the ink droplets will be directed in order to print the letters and signs.

Another known typical ink-jet printer consists of feeding ink to the nozzle with a relatively high pressure to blow the ink stream from the nozzle, applying an electric field of an intensity corresponding to the position in the main scanning direction on the printing paper surface to the space between the charging electrode placed at a position where the ink stream divides itself into ink droplets and the nozzle in order to selectively charge the ink droplets and to cause the charged ink droplets to be deflected in the main scanning direction, and moving the printing head at a definite speed and continuously in the subscanning direction to print the letters and signs successively.

The above-mentioned two types are different in regard to their objects that will be controlled according to letter pattern information, and depending on their objects; the former is known as the electric field control type, and the latter the charge control type.

Concerning the electric field control type printers, since the relation between the printer head and the printing paper at least during the printing of a letter is fixed, it is desirable to provide a mechanism that intermittently feeds the printer head, such as a type writer, punching type writer, or telegraph printing mechanism. But such printers require the application of a voltage as high as about 10,000 volts. Also for the purpose that the electric field established between a pair of electrostatic deflection plates may cause deflection of the desired ink drops only, the length of the electrostatic deflection plates along the ink drop running direction has to be nearly equal to, or less than, the distance between the ink droplets; hence speeding up the formation of ink drops merely results in the degraded deflection sensitivity.

As for the charge control type printers, the application of a d-c voltage to the electrostatic deflection plate pair provides an advantage in that the deflection sensitivity can be set independently of the ink drop formation rate. But in such printers, since the displacement of ink drops in the lateral direction depends on the movement of the printer head, and tracing performance of the printer head at the time of starting and stopping had always provided problems for the printers interlocked to the key devices.

It is therefore an object of this invention to provide a printer which can feed the printer head either continuously or intermittently by the employment of a printerhead feeding mechanism.

Another object of this invention is to provide an improved printer having increased deflection sensitivity.

Yet another object of this invention is to provide an improved printer which features increased printing speed when the printer head is being fed continuously.

SUMMARY OF THE INVENTION

To achieve the above-mentioned objects, this invention comprises an ink injection means which ejects an ink stream from the nozzle by feeding ink to the nozzle with the application of a relatively high pressure, a charging electrode provided at the position where the ink stream splits itself to ink droplets, and at least a pair of main electrostatic deflection plates which electrostatically deflect the charged ink droplets toward a certain direction. The charging voltage applied to the charging electrode consists of electric pulses of letter patterns represented by digital data, and the charging amount is constant regardless of the positions of ink drops adhered onto the surface of the printing paper. The deflection signal applied to the main electrostatic deflection plate pair is a predetermined mode main frequency wave voltage, usually, being of a saw-tooth wave form, and the position of an ink drop ahdered onto the surface of the printing paper is controlled by the timing of the ink drop entering between the electrostatic deflection plates. In an embodiment of this invention, a pair of sub-electrostatic deflection plates are provided, also. Where the printer head is being fed intermittently, a sub-frequency wave voltage of a frequency several times greater than that of the main frequency wave voltage is applied to the sub-electrostatic deflection plate pair; the voltage usually being of a step-like form of a saw-tooth wave form. When the printer head is being fed at a constant speed continuously, the sub-electrostatic deflection plate pair may be separated from the power system, or a voltage of a frequency to increase the printing speed may be applied to the sub-electrostatic deflection plate pair.

In this invention, the printing speed and the deflection sensitivity can be set almost independently according to the rate of ink drop formation. But where more increased deflection sensitivity is required, both the main and sub-deflection plates or either one of the above two may be set up with a plurality of electrostatic deflection plates to meet the requirements.

BRIEF DESCRIPTION OF THE DRAWINGS

FIG. 4 is a diagram showing the pattern of an example of letters recorded by this invention.

FIG. 5 is a diagram showing the time relation between the nozzle driving period CP and the charging voltage wave form Sc.

FIG. 6 is a diagram showing the relation between the main electrostatic deflection voltage $S_Y$ and the ink drop.

FIG. 7 is a diagram showing relation between the main electrostatic deflection voltage $S_Y$ and the sub-electrostatic deflection voltage $S_X$.

FIGS. 12 and 13 are diagrams showing time relation between the deflection voltage of the electrostatic deflection plate pair and an ink drop passing therethrough.

FIG. 14 is a diagram showing an example of the letters printed by the ink-jet printer of this invention.

FIG. 15 is a diagram showing an example of the main electrostatic deflection voltage $S_Y$ and the charging voltage Sc in this invention, and FIG. 16 is a diagram showing the relations among deflection voltages $S_Y$ and $S_X$ applied to the main and sub-electrostatic deflection plate pairs and a charging signal wave form Sc in an embodiment of this invention.

DETAILED DESCRIPTION OF THE INVENTION

Figure 1:
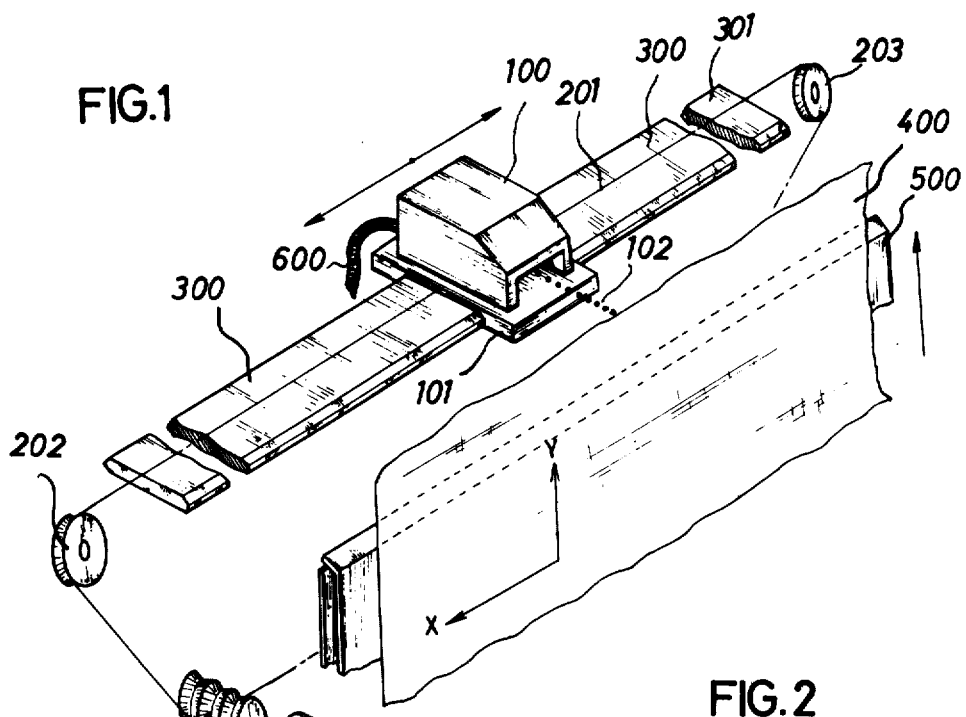
FIG. 1 is a schematic view showing an example of the printing part of the ink-jet printer according to this invention.

Referring to FIG. 1, numeral 100 represents a printer head with its bed 101 being fastened with wire 201 at the right and left sides. The wire 201 is connected to a drive pulley 204 via pulleys 202 and 203 and is tensioned in an endless manner. The shaft of the drive pulley 204 is directly coupled to the rotary shaft of a servo motor 205. The drive pulley 204 is rotated by the rotation of the servo motor 205, so that the wire 201 is moved right or left to move the printer head 100 on a guide rail 300 toward the right or left.

An ink-drop train 102 is injected from the printer head 100 toward printing paper 400. The printer head 100 being moved intermittently on the guide rail 300 as mentioned above, performs a line of printing on the printing paper 400 in the lateral direction X. After a line of recording has finished, the printing head 100 is returned to the initial point 301 at the left end, (from a facing the paper direction) and the printing paper 400 is transferred for the next line by an ordinary paper-feed mechanism (not shown). Numeral 600 is a cable guide for feeding electric signals to the printer head 100.

Figure 2:
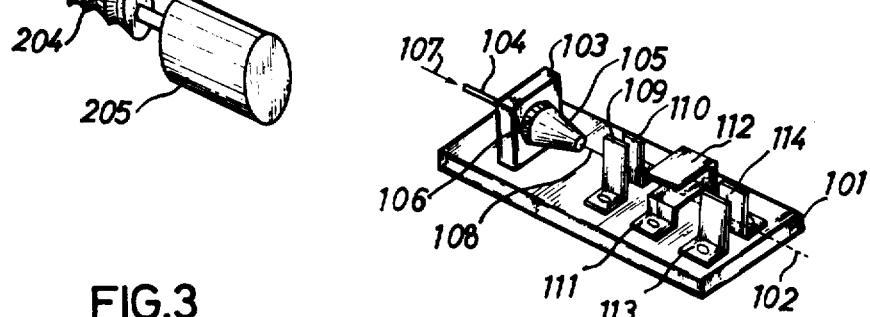
FIG. 2 is a perspective view showing the setup of the printer head of FIG. 1.

Referring to FIG. 2, numeral 103 stands for a nozzle holding bed behind which is penetrating an ink tube 104 to connect to a nozzle 105. Nozzle 105 is of a horn shape and has a small aperture at the center. Numeral 106 is a cylindrical piezo-electric element which is firmly held to the nozzle 105. An electric conductive ink is used; the ink 107 is supplied with pressure from a pump system (not shown) through the ink tube 104, and an ink stream 108 is ejected from the tip of the horn-shaped nozzle 105. Due to the vibration caused by the piezo-electric element 106, the ink stream 108 is caused to split itself into an ink-drop train 102. Numerals 109 and 110 are charging electrodes being disposed on the horizontal plane X and to the right and left sides with respect to the ink stream 108, and electrically consist of a single electrode plate. Numerals 111 and 112 are the main electrostatic deflection plate pair, and are positioned above and below on the vertical plane Y with respect to the ink-drop train 102. Numerals 113 and 114 are a subelectrostatic deflection plate pair, and are positioned to the right and left on the horizontal plane X with respect to the ink-drop train 102. Nozzle 105, charing electrodes 109 and 110, and deflection plates 111-114 are all attached to the head bed 101.

Figure 3:
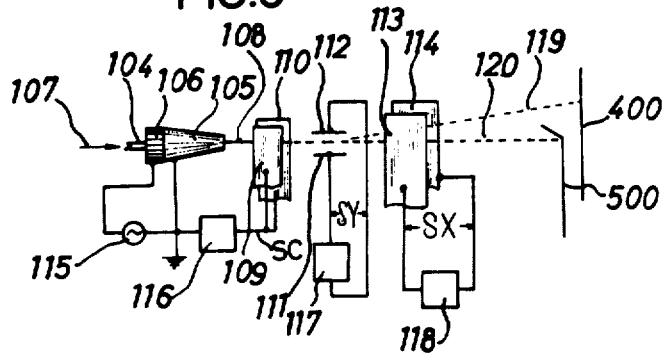
FIG. 3 is a schematic diagram of the ink-jet printer shown in FIG. 1.

Referring now to FIG. 3, the nozzle 105 is connected to the reference potential, and the piezo-electric element 106 is energized with a pulse voltage CP of a definite frequency from the nozzle driving source 115. The nozzle 106 is vibrated to transmit its vibration to the tip of the nozzle 105. Ink 107, as mentioned above, is supplied being pressurized through the ink tube 104, and is ejected as an ink stream 108 from the horn tip. At this moment, a regular wave is induced in the ink stream 108 due to the vibration at the nozzle tip; the wave is gradually amplified through the ink stream 108, and when the amplitude becomes equal to the diameter of the ink stream 108, the ink stream 108 is caused to split itself into ink-drop train 102. The ink-drop train 102, in synchronism with the vibration frequency of the nozzle 105, is formed maintaining equal distance and in a uniform size. The charging electrodes 109,110 being positioned over the areas where the ink stream 108 splits into ink-drop train 102, are served across itself and the nozzle 105 with a pulse voltage Sc of a definite amplitude by the charging voltage source 116 in synchronism with the formation of ink-drop train 102, in order to selectively charge the ink drops 102. Ink-drop train 102 passes through the main and sub-electrostatic deflection plate pairs 111-114, each of which has been applied with deflection voltages $S_Y$ and $S_X$ by the main deflection voltage source 117 and the sub-deflection voltage source 118, so that the charged ink-drop train 119 is electrostatically deflected in the vertical Y and horizontal X directions. The ink drops pass over an ink-drop capturing means 500 and reach the printing paper 400 to effect printing. The uncharged ink-drop train 120 undergoes no deflection and proceeds straight to be recovered by the ink capturing means 500.

FIG. 4 shows a letter formed by the main scanning direction, i.e., dot trains $Y_1$-$Y_9$ in the vertical direction Y, and by subscanning direction, i.e., dot lines $X_1$-$X_7$ in the horizontal direction X. Arrows in the Figure indicate the scanning directions. In this instance, since the letters, numerical figures and signs are printed by electrically scanning the letter in the vertical and horizontal directions Y and X, the head is stationary with respect to the printing paper 400, while the letters, numerical figures or signs are being printed.

FIG. 5 shows the relation among a pulse voltage CP applied to the piezo-electric element 106, charging voltage Sc applied to the charging electrodes 109, 110, and the timing of ink-drop formation, by referring to the case shown in FIG. 4 where the letter "H" is printed. Signs of dot lines $Y_1$-$Y_9$ responsive to the letter "H" are attached to represent the pulse voltage CP, and the signs of dot trains $X_1$-$X_7$ are attached to represent the charging voltage Sc.

Referring now to FIGS. 4 and 5, at the left end dot train $X_1$ of the letter patterns that will be printed, D have been printed throughout all dot lines $Y_1$-$Y_9$; hence while ink drops, $D_1$-$D_9$ are being formed, the charging volume will assume a potential $E_1$ representing "1" of the binary notation.

On the dot trains $X_2$-$X_6$, the dots D will be printed only on the dot line $Y_5$; hence the charging voltage Sc will assume "1" of binary notation at the timing corresponding thereto.

For the timing of forming ink drops 102 that do not contribute to the printing and will be recovered by the ink capturing means 500, the charging voltage is at the ground level equal to the earth potential $E_2$.

Referring to the charging voltage Sc, there are periods to control the charging amount of nine ink drops $D_1$-$D_9$ corresponding to the dot trains $X_1$-$X_7$ as shown in FIG. 4 and periods which do not directly contribute to the printing of the pattern of the letter; the former is called printing periods PRT, and the latter the dummy periods DAM.

Next, referring to FIG. 6, the numeral 111a represents the position of inlet of the main electrostatic deflection plate 111 and 112, and 111b represents the position of outlet of the main electrostatic deflection plate pair 111 and 112. Hence, for example, where the main deflection voltage $S_Y$ is $E_3$, the ink drop $D_5$ at time $t_3$ will enter the main electrostatic deflection plate pair 111 and 112. In FIG. 6, at time $t_1$, the first ink drop $D_1$ of the dot train $X_1$ will first enter to the deflection plate pair 111 and 112. If now the time required for an ink drop passing through the deflection plate pair as will be determined by the length of the deflection plate pair 111, 112 along the drop proceeding direction and the speed of the ink drop passing is denoted by T, then the first ink drop $D_1$ will come out of the deflection plate pair 111, 112 at time $t_3$. Since the deflection amount that will be given to the first drop $D_1$ will be approximately proportional to the time integration of the deflection voltage across te deflection plate pair, the first ink drop $D_1$ will receive the force of deflection proportional to the area $S_1$ shown in FIG. 6. Similarly, the second ink drop $D_2$ which enters at time $t_2$ and comes out at time $t_4$ will receive the deflection proportional to the area $S_2$ of FIG. 6. The same holds true for other ink drops $D_3$-$D_9$. For example, the ninth ink drop $D_9$ which enters at time $t_5$ and comes out at time $t_6$ will receive the deflection proportional to the area $S_9$. The saw-tooth wave is returned to the initial form at time $t_7$ and is transferred to the printing of the next dot train $X_2$. While the ninth drop $D_9$ has entered the deflection plate pair 111 and 112 and is passing therethrough, i.e., the ink drops entering to the deflection plate pair 111, 112 during the time $t_5$-$t_7$ of FIG. 5 are not used for printing; such uncharged drops are dummy drops which account for the necessity of the dummy period DAM: The areas $S_1$, $S_2$ . . . $S_9$ increase in the manner of arithmetical series and account for the deflection in the required main scanning direction. The size of the letter recorded in the vertical direction is proportional to the difference in deflection amount between the first drop $D_1$ and the ninth drop $D_9$, and is given by the difference obtained by subtracting area $S_1$ from area $S_9$ of FIG. 6. The area $S_1$ is also common for all ink drops and gives the amount by which the ink drops pass over the ink capturing means 500. As mentioned above, the deflection method according to this invention requires the following two essential conditions: (1) to appropriately set the timing of printing drops of one dot train, e.g., $D_1$-$D_9$, which are entering to the deflection plate pair 111, 112, and to set the repeating phase of the main deflection voltage, Sy, and (2) to confine the time required for the dot train, e.g., the time required from the first drop $D_1$ entering to the deflection plate pair 111, 112, up to the final drop $D_9$ coming out of the deflection plate pair 111, 112, within the sweeping period of the main deflection voltage. But by introducing a dummy period DAM, for example, dummy drops $D_{10}$-$D_{13}$, a considerable amount of deflection can be obtained.

The main electrostatic deflecton signal $S_Y$ is of a saw-tooth wave of a period $T_O$ and peak value $E_4$, as shown in FIG. 7. The sub-electrostatic deflection voltage $S_X$ is of a saw-tooth wave of a period as long as $7T_O$ and peak value $E_5$. The reason why the period of the sub-electrostatic deflection voltage $S_X$ is 7 times results from the dot train, i.e., 7 rows $X_1$-$X_7$, as shown in FIG. 7. Deflecting method in the sub-deflecting direction is similar to the main deflecting method; it is necessary to make the length of the sub-electrostatic deflection plate pair 113, 114 along the drop running direction nearly equal to the length along the main scanning direction. The peak values $E_4$ and $E_5$ of the deflection voltages $S_Y$ and $S_X$ are determined by the size of the letter in the vertical and horizontal directions, i.e., by the deflection sensitivity. In an embodiment of this invention, since the saw-tooth wave is used for the sub-deflection direction, the letters recorded will be somewhat aslant. Also, as for the phase between the deflection voltage $S_Y$ and the deflection $S_X$, correction is needed by the amount equal to the time lag from the time at which ink-drop train 102 has entered the main electrostatic deflection plate pair 111, 112 to the time at which the same ink-drop train has entered the sub-electrostatic deflection plate pair 113, 114.

Figure 8:
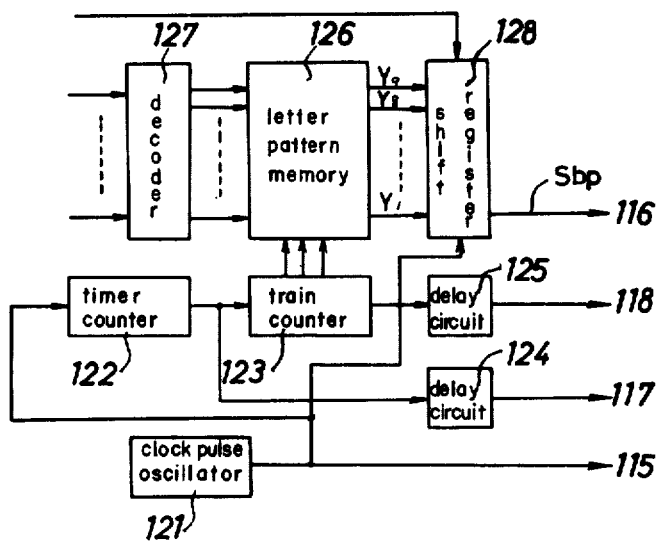
FIG. 8 is a block diagram of the control system to obtain electrical signals which will be applied to the printer head.

The control circuit to control the electric circuits is as shown in FIG. 8. Numeral 121 is a clock pulse oscillator, at which frequency the nozzle driving source 115 will be operated. Numeral 122 is a 4-bit duorinary (numerical base of 13) line counter to count the number of ink drops contained in one cycle of the main deflection voltage $S_Y$ inclusive of the ink drops $D_{10}$-$D_{13}$ during the dummy period DAM of FIG. 3 and 6. Numeral 123 is a train counter to count the number of dot trains of letter pattern; a 3-bit heptanary (numerical base of 7) counter is used because the letter in FIG. 13 is formed of seven dot-lines $X_1$-$X_7$. The carry of the line counter 122 is put into a main scanning phase delay circuit 124 and is delayed by an appropriate amount to be given as a timing signal to the main deflection voltage source 117. The carry of the train counter 123 is put into a sub-scanning phase delay circuit 125 and is delayed by an appropriate amount to be given as a timing signal to the sub-deflection voltage source 118. The phase delay circuits 124 and 125 are to correct the time lag from the time at which the ink drop 102 is charged to the time at which the same drop reaches the main and the sub-deflection plate pairs 111-114, as mentioned above. Hence, the delay times can be varied according to the speed of the ink drop 102. The output of each bit from the train counter is given to a letter pattern memory 126 as a dot train selection signal of letter pattern. The letter input signals that will be printed are put into a decoder 127 in the form of letter codes. The decoder 127 reads the letters, produces signals to specify particular portions of the letter pattern memory, and specifies a letter. According to line selection signals, the information of one dot train of letters, etc. that will be printed is set in parallel in the shift register 128. Simultaneously with the letter code, the printing command is given as a reset releasing signal to the shift register 128. The shift register 128 is shifted in synchronism with the clock pulse of the clock pulse oscillator 121 to produce its output sequentially and in series. Also, while the printing command is not being given, the shift register 128 is reset and no charging signal Sc is produced.

Figure 9:
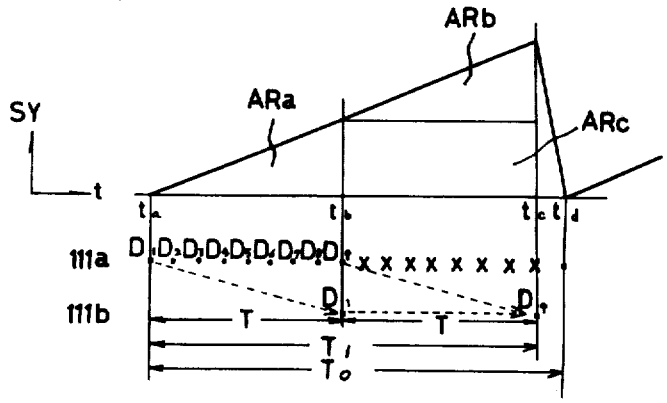
FIG. 9 is a diagram showing the relation between the main electrostatic deflection voltage $S_Y$ and the ink drop for obtaining maximum deflection under the condition that the amplitude of the deflection voltage remains constant.

Next, if now the scanning period from which is subtracted a flyback time within the period $T_O$ is denoted by $T_1$ with the main deflection voltage $S_Y$, the first drop $D_1$ enters to the deflection plate at time $t_a$ and comes out at time $t_b$, and th ninth drop $D_9$ enters at time $t_b$ and comes out at time $t_c$, as shown in FIG. 9, in order that the ink-drop speed is set to $T = \frac{1}{8} \times T_1$. The area to give deflection to the first drop $D_1$ is denoted by $AR_a$, and the area to give deflection to the ninth drop $D_9$ is ($AR_b$ + $AR_c$), where $AR_a = AR_b$; hence the difference $AR_c$ represents displacement giving a maximum of deflection. In such a case, the ink drops entering to the deflection plate pair during $t_b$ to $t_d$ turns into dummy drops.

As for the sub-electrostatic deflection plate pair 113, 114, a maximal deflection condition can be obtained by making the length of the sub-electrostatic deflection plates equal to the length of the main electrostatic deflection plate pair 111, 112 and the amplitude of the deflection voltage can be reduced.

Also, where a larger deflection is required with the peak amplitude of the deflection voltages $S_Y$, $S_X$ being constant, many main or sub-electrostatic deflection plate pairs may be provided to meet the requirement thereby applying a deflection voltage of the phase determined by taking into account the distance between a plurality of deflection plate pairs.

Figure 10:
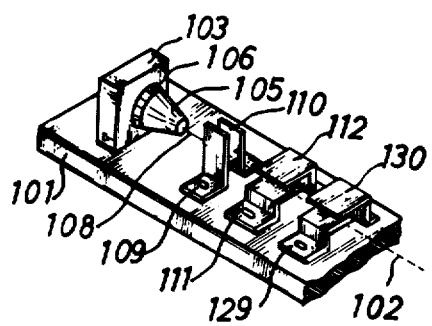
FIG. 10 is a schematic perspective view showing another example of the printer head used in an embodiment of this invention.
Figure 11:
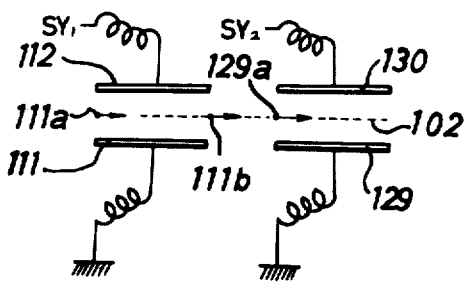
FIG. 11 is a diagram showing the condition in which ink drop is passing through the deflection plates.

Furthermore, where it is intended to obtain greater deflection, the following method may be employed. That is, by referring to FIGS. 10 and 11, if now the time required by an ink drop 102 to pass through the distance from the inlet 111a of the first main electrostatic deflection plate pair 111, 112 to the inlet 129a of the second main electrostatic deflection plate pair 129, 130, is denoted by $T_2$, a deflection voltage $S_Y$ of which time being delayed by $T_2$ behind the deflection voltage $S_{Y_1}$ of the main electrostatic plate pair 111, 112 may be applied to the second main electrostatic deflection plate pair 129, 130 as shown in FIG. 12.

Referring to FIG. 12, the time required for an ink drop to pass through the second main electrostatic deflection plate pair 129, 130 is equal to the time $T_1$ required for an ink drop to pass through the first main electrostatic deflection plate pair 111, 112. And the first drop $D_1$ in the dot train $X_1$ undergoes deflection in amount proportional to the black area $Q_a$ of FIG. 12 thereby passing through the first main electrostatic deflection plate pair 111, 112, and then, being delayed by time $T_2$, and the first ink drop $D_1$ enters to the second electrostatic deflection plate pair 129, 130 to undergo the deflection in amount proportional to the same area $Q_a$, thus receiving doubled deflection as compared to the case where the ink drop has passed through only one pair of electrostatic deflection plates. The second drop $D_2$ and the succeeding drops behave in the same manner as the first drop $D_1$. The succeeding drop lag by the time equal to dot by dot, and enter to the electrostatic deflection plate pair 111, 112. The amount of deflection will be determined by the deflection voltage and the passing time $T_1$ to pass through the electrostatic deflection plate pair; hence the deflection of which amount increasing little by little and all being larger than that of the first drop $D_1$, will be given to the drops, so that drops hit the paper at each dot position as shown in FIG. 4. Also, as shown in FIG. 13, with the distance between the electrostatic deflection plate pairs so set that the time $T_3$ required by the drop to pass from the inlet of the first electrostatic deflection plate pair 111, 112 through up to the inlet of the second electrostatic deflection plate pair 129, 130, is equal to the period $T_O$ of the deflection voltage, the phase between the deflection voltages $S_{Y_1}$ and $S_{Y_2}$ applied to the electrostatic deflection plate pairs may be made equal. Moreover, by setting the time $T_4$ required by the ink drop 102 to pass through all the electrostatic deflection plate pairs 111, 112, 129, 130, to be nearly half of said period $T_O$, the amount of deflection can be made a maximum.

In an embodiment shown in FIg. 1, the printer head 100 has been so designed as to halt its motion while it is printing a letter, numerical figure or sign, and after having printed a letter, moves itself and then comes to a halt to print the next letter, thus repeating such operation. But it is possible to run the printer head continuously at a definite speed in the horizontal direction, i.e., in the sub-deflection direction of the letter, to print the charged ink drops, while the printer head is running. For this purpose, the sub-electrostatic deflection signal $S_X$ in FIG. 3 is maintained at ground level, or the sub-electrostatic deflection plate pair 113, 114 is removed. In short, no deflection is effected in the horizontal direction; printing is performed by moving the printer head 100 in the horizontal direction.

The embodiment just mentioned is illustrated below with reference to FIGS. 14 and 15.

FIG. 15 shows the wave form of the charging voltage Sc; in this example, one letter has been exemplified to be printed with all dots 7X9. Between the dot train $X_7$ and the next dot train $X_1$ is a dummy period $DAM_1$ where the charging voltage Sc will be maintained at the ground level. In effect, in order to provide distance between the neighboring letters, a dummy period $DAM_1$, an integer times larger than the period $T_O$ of the main deflection voltage $S_Y$, is inserted so that no charge is given to the ink drops during the dummy period $DAM_1$. Hence such ink drops do not print and the amount of the printer head 100 movement in the horizontal direction defines a distance between the neighboring letters. Also, by allowing such a continuous transmitting mode to correspond to the receiving operation of a telegraph printer, allowing intermittent transmitting mode to correspond to the transmitting operation, and interchanging the intermittent printing and continuous printing depending on the receiving operation and the transmitting operation, the printed letter received will be of italic form and the printed letter of the transmitting motion will be of straight form, thus enabling quick perception as to whether the letter being printed is that transmitted or received.

According to this invention, dummy period $DAM_1$ between letters can be eliminated to increase the printing speed. For this purpose, the printer head 100 is the set up shown in FIG. 2 is moved continuously, and sub-deflection voltage different from that shown in FIG. 7 is provided. The operation is illustrated below with reference to FIG. 16.

As shown in FIG. 16, $S_{x_1}$ represents a sub-deflection voltage that will be applied to the sub-electrostatic deflection plate pair 113, 114, and has the amplitude 2/7 times that of the deflection voltage $S_X$ shown in FIG. 7 and a period 7 times longer than that of the main deflection voltage $S_Y$. At the moment when a letter is just printed and the next letter is to be just printed, the deflection in the horizontal direction starts to be reduced into an amplitude 2/7 $\times$ $E_5$, and is represented as a space between letters on the printing paper 400.

In the foregoing embodiments, the main scanning direction was all taken in the vertical direction and the sub-scanning direction in the horizontal direction. But in the case of intermittent recording, the horizontal direction may be taken into the main scanning direction and the and the vertical direction into the sub-scanning direction.

Also in the foregoing embodiments, the sub-deflection voltage $S_X$ was a saw-tooth wave But as a wave form of the sub-deflection voltage, those which assume a step-like wave form of which voltage changing step by step for every cycle of the main deflection voltage and which returns to the ground level with the finish of the letter printing, may be used. By doing so, the printing will be effected with erected letters and not sloping letters shown in FIG. 14.

The foregoing embodiments saw-tooth waves for the main deflection voltage $S_Y$, but a rectangular wave having about 50% duty ratio may be used for this purpose. By employing a rectangular wave voltage, the amount of deflection can be doubled with the same peak value as that of the saw-tooth wave. In such a case, no ink drops will have common deflection value to pass over the ink-drop capturing means, and the ground level of said wave will have to be raised to some potential level.

What is claimed is:

1. For an ink jet printer in which an ink stream is ejected from a nozzle and travels along a path to reach a printing medium, said printer comprising means for splitting said ink stream into ink drops, a charging electrode provided at a position along said path where said ink stream splits into said ink drops, said ink drops passing through said charging electrode, voltage means connected to said electrode for supplying a periodic voltage to said electrode to charge said ink drops, at least a pair of main electrostatic deflection plates located along said path and having a length in the direction of said path at least slightly greater than the distance between sequential ink drops, voltage means for applying a periodic voltage to deflect at least two of said charged ink drops simultaneously in a main scanning direction, said ink drops passing therethrough in a time period, digital data pulse means representing the pattern figures to be printed connected to said voltage means applied to said charging electrode, means synchronizing said periodic voltage applied to said charging electrode with the time it takes for an ink drop to pass through said main electrostatic deflection plates to provide a printing period during which said ink drops may be charged and a dummy period when said ink drops are prevented from being charged.

2. The ink jet printer of claim 1, wherein the periodic voltage applied to the main electrostatic deflection plates is of a saw-tooth wave form, and the period of the said saw-tooth wave form is at least twice the time period required for an ink drop to pass through said main electrostatic deflection plates.

3. The ink jet printer of claim 1, further comprising at least one additional pair of electrostatic deflection plates which electrostatically deflect the charged ink drops, voltage means for applying a periodic voltage to said additional electrostatic deflection plates, synchronization means connected between said voltage means for said main electrostatic deflection plates and said additional electrostatic deflection plates to allow each ink drop to enter the respective deflection plate pair at corresponding times in the respective periodic voltages.

4. An ink jet printer for a printing medium comprising a nozzle means to inject a compressed ink stream from said nozzle toward said printing medium, means for splitting said ink stream into a plurality of ink drops, a charging electrode provided at a position where said ink stream splits into said ink drops, a main electrostatic deflection plate pair through which said ink drops pass, a periodic voltage applied to said main electrostatic deflection plate pair, an electrical signal applied to said electrode for charging said drops, said electrical signal being periodic and being in synchronism with said periodic voltage, said periodic voltage causing the charged ink drops to deflect in a main scanning direction as they pass said main electrostatic plate pair, at least a pair of sub-electrostatic deflection plates to deflect the charged ink drops in a sub-scanning direction, said sub-scanning direction being at right angles to main scanning direction, said sub-electrostatic deflection plates receiving a periodic voltage having a period several times greater than said periodic voltage applied to said main deflection plate pair, and means to move a printer head comprising said printer along a line being printed to accomplish printing of a symbol.

5. An ink jet printer of claim 4, wherein said means to move said printer head to print said symbols comprises means for continuously moving said printer head, said periodic voltage applied to the sub-electrostatic deflection plate pair being inhibited during the continuous movement.

6. An ink jet printer of claim 4, wherein said means to move said printer head to print said symbols comprises means for continuously moving said printer head, and said periodic voltage applied to said sub-electrostatic deflection plate pair comprises a step voltage.

7. An ink jet printer on claim 4, wherein said means to move said printer head to print said symbols comprises means for continuously moving said printer head, and said periodic voltage applied to said sub-electrostatic plate pair comprises a saw-tooth voltage.

* * * * *